(12) United States Patent
Crane et al.

(10) Patent No.: US 6,595,034 B1
(45) Date of Patent: Jul. 22, 2003

(54) SIMULATED TEST JOINT FOR IMPULSE TOOL TESTING

(75) Inventors: David Ogilivie Crane, Lutterworth (GB); Peter William Everitt, Barwell (GB); Mark Simon Sloan, Castle Donnington (GB)

(73) Assignee: Crane Electronics Ltd., Leicestershire (GB)

( * ) Notice: Subject to any disclaimer, the term of this patent is extended or adjusted under 35 U.S.C. 154(b) by 0 days.

(21) Appl. No.: 09/674,619
(22) PCT Filed: May 4, 1999
(86) PCT No.: PCT/GB99/01373
§ 371 (c)(1),
(2), (4) Date: Jan. 22, 2001
(87) PCT Pub. No.: WO99/57533
PCT Pub. Date: Nov. 11, 1999

(30) Foreign Application Priority Data

May 1, 1998 (GB) .............................. 9809327

(51) Int. Cl.$^7$ .............................. G01L 3/10
(52) U.S. Cl. ..................................... 73/1.12
(58) Field of Search ................. 73/1.09, 1.11, 73/1.12, 862.191, 862.541, 865.6, 865.9

(56) References Cited

U.S. PATENT DOCUMENTS 5,383,370 A * 1/1995 Abramson et al. ....... 73/862.23

* cited by examiner

Primary Examiner—Robert Raevis
(74) Attorney, Agent, or Firm—Buchanan Ingersoll, P.C.

(57) ABSTRACT

An apparatus for celibrating rotary power assembly impulse tools comprises a variable rate simulated test joint in which a rotary shaft is braked by brake shoes in direct contact with the shaft under the control of a computer. The braking torque applied to the shaft by the brake shoes is gradually increased while the shaft is driven at free-running speed by the tool being calibrated, and the pulsed output of the impulse tool is monitored. The monitored pulsed output is initially erratic, but settles down to a regular stream of output pulses. The first pulse of that regular stream can be identified. The magnitude of the braking torque is then increased as a linear function of time with a predefined gradient representative of the torque rate of the joint being simulated, commencing with the identified first pulse. The apparatus is the first such apparatus to be able to provide thoroughly reliable and consistent torque calibration for impulse tools.

11 Claims, 4 Drawing Sheets

SIMULATED TEST JOINT FOR IMPULSE TOOL TESTING

DESCRIPTION

1. Field of the Invention

The invention relates to calibration equipment for testing the accuracy and consistency of rotary power assembly tools for threaded fasteners, and in particular for impulse tools.

2. Background Art

Our earlier filed PCT patent application published as WO98/10260 discloses a simulated test joint for use with power assembly tools such as power screwdrivers, torque wrenches, pneumatic nut runners and hydraulic impulse tools. It discloses a variable rate test joint comprising a housing, a shaft mounted within the housing, means for coupling a tool to be tested to the shaft, a brake shoe assembly for contacting the shaft to apply a frictional torque to the shaft, and a computer for controlling the magnitude of the braking torque applied to the shaft as a function of time. By modelling the increase of braking torque on the shaft as a time-dependent function rather than an angle-dependent function the test joint of WO98/10260 proves itself suitable for the calibration of impulse tools as well as of constant torque tools such as torque wrenches.

The universally accepted sequence of phases in the calibration of any constant torque power tool is as follows:

Phase 1: Run the power tool so as to operate the test joint without any external load until the power tool reaches its normal free-running speed. This phase simulates the "rundown" of a threaded fastener, in which a nut, for example, is advanced along a screw thread towards engagement with an abutment surface of an article to be fastened. There is no resistance to rotary movement other than the inevitable but small friction losses which would occur during the "rundown" of the threaded fastener.

Phase 2: Apply a friction torque up to about 5% to 10% of the rated maximum torque for the tool. This simulates the fastener being driven to its "snug" condition in which all free play has been absorbed.

Phase 3: Increase the torque applied by the friction brake, following a prescribed torque/angle relationship which is a straight line characteristic according to ISO 5393. The gradient of the torque/angle relationship defines whether the simulated joint is hard or soft in accordance with ISO 5393 which defines four grades of torque rate graded A to D. This phase of progressive torque increase commences at the end of the above Phase 2.

Termination: Measurements stop when the tool and simulated joint stop rotating. This condition is unambiguously identifiable when the tool being tested has an automatic shut-off mechanism, but for manually controlled tools becomes a matter of judgement. If an operator judges the moment of "stopping" too early, the results of a test will be very variable. If an operator judges the moment of "stopping" too late, the simulated test joint will have locked solid and the tool will be reacting against a solid and immovable object, which is likely to record an unrealistically high torque.

The above criteria, although developed for constant torque tools such as torque wrenches or power screwdrivers, have also been applied without modification to impulse tools. For a constant torque tool the tool could if desired be held without the application of torque for a period between Phase 2 and Phase 3, or the torque ramp of Phase 3 could begin immediately after Phase 2 is complete, with the fastener driven to its "snug" condition. For an impulse tool of course the tool flywheel is already rotating at maximum speed when Phase 2 finishes, so immediate progression to Phase 3 is necessary. There are other more significant differences between the behaviour of constant torque tools and impulse tools, and this invention is based on the fact that impulse tools behave differently, so that modified criteria are necessary before the simulated test joint can provide a truly accurate calibration of the impulse tool.

In particular, this invention is based on the realization that for pulse tools the assessment of completion of Phase 2 and of Termination is subject to considerable uncertainty. When a pulse tool is run in free six (Phase 1), it will reach very high speeds. Five thousand rpm is not unknown. When running at such high speeds, some pulse tools will deliver one very large pulse or a series of very large pulses on encountering an initial and possibly very small torsional resistance. That initial torsional resistance may be due to initial and possibly uncharacteristic engagement between the brake shoes and the shaft or may even be due to a side loading on the impulse tool as it is held on the simulated joint, and unrelated to the braking torque applied to the rotary shaft. During this time, the speed of the pulse tool will reduce and it will tend not to deliver any more pulses until it encounters greater torsional resistance. In these circumstances, there is a period of very significant instability during the transition from free-running to normal pulsing of the pulse tool. Only when the proper pulsing mode is securely established will torque pulses be developed by the tool at regular intervals and of increasing magnitude, to react against an increasing braking torque applied to the shaft. No known means for identifying the completion of Phase 2 in the above test sequence is able to compensate for the period of instability during the transition from Phase 1 to Phase 2. It is an object of the invention to overcome the above problems and to provide calibration apparatus for calibrating pulse tools which overcomes the above problems. It is a further object of the invention to provide such calibration apparatus that is capable of calibrating both pulse tools and constant torque assembly tools with equal accuracy.

The Invention

The invention provides an apparatus for calibrating rotary power assembly impulse tools, comprising a variable rate simulated test joint in which a rotary shaft is braked by brake shoes in direct contact with the shaft under the control of a computer; means for gradually increasing the braking torque applied to the shaft by the brake shoes while the shaft is driven at free-running speed by the tool being calibrated; means for monitoring the pulsed output of the impulse tool; means for recognizing from the monitored output a regular stream of output pulses from the impulse tool and for identifying the first pulse of that regular stream; and means for increasing the magnitude of the braking torque as a linear function of time with a predefined gradient representative of the torque rate of the joint being simulated, commencing with the identified first pulse.

The recognition of the regular stream of output pulses from the impulse tool can be achieved by recognizing the establishment of n successive pulses at equal or substantially equal time intervals t, where n is an integer greater than 2, preferably 3 or 4, and t is preferably approximately the natural pulsing frequency of the tool.

The n pulses may be monitored as torque pulses sensed using a torque transducer on or associated with the shaft of the simulated test joint, in which case the pulses are counted as only those pulses in excess of a given torque threshold. However some pulse tools produce their torque output pulses not as single pulses but as pulse pairs one or both of which may be over the given torque threshold but which together result in a single continuous angular movement of the shaft. Such pulse pairs may be perceived and counted as either single pulses or double pulses depending on the frequency response of the monitoring means, but according to this invention are preferably counted as single pulses. Therefore it is clear that careful attention to selection of the most appropriate frequency response is necessary when monitoring torque pulses according to the invention.

Alternatively the n pulses may be monitored as angle pulses sensed using an angle encoder associated with the shaft of the simulated test joint. Typically the angle encoder is one that recognizes angular shaft movements of for example 0.5°, each 0.5° of shaft movement producing a leading or trailing edge in a square waveform output. Therefore a complete pulse cycle would represent 1° of shaft movement between repeating positive-going transitions in the output waveform. If for example a single torque pulse resulted in a 3° shaft movement, then that shaft movement would be monitored as a single angular event as represented by a closely grouped set of three complete pulses in the output waveform, each pulse having one leading edge and one trailing edge.

It may be desirable to count the number of output pulses of the impulse tool during the above Phase 3 of the calibration sequence, since this information can be of use in assessing and grading the performance of the assembly tool. Such counting is readily achievable according to the invention since it is a simple count of the monitored output pulses from the impulse tool. Preferably however when such counting is a feature of the apparatus of the invention the pulses being monitored and counted are pulses of 'single angular events' as discussed above.

The same apparatus may be used in accordance with teachings of WO98/10260 for the calibration of rotary power assembly constant torque tools.

The apparatus of the invention advantageously further includes means for identifying the termination of the test sequence accurately and using essentially the same analytical techniques as those used to determine the transition from Phase 2 to Phase 3. The pulses monitored may be torque or angle pulses. The means for monitoring the pulsed output of the impulse tool continues its analysis during the whole of the test cycle, and preferably includes means for identifying the last pulse of that regular stream. After that last identified regular pulse, the pulse output of the tool becomes erratic, indicating that the simulated test joint has locked solid so that the impulse tool is reacting against a solid and immovable object. Monitoring is continued until the regularity of the pulsed output is lost, but all measurements made after the identified last regular pulse are ignored. This provides reliability of the calibration even when the tool does not have automatic shutoff and when the test continues after the shaft has locked fully. If on the other hand the user terminates such a test prematurely, before the shaft has locked fully, then the continued monitoring of the pulsed output of the impulse tool will indicate to the computer that the termination condition has not yet been reached, in which case the apparatus should preferably automatically indicate that the calibration is null and void.

DRAWINGS

Figure 1:
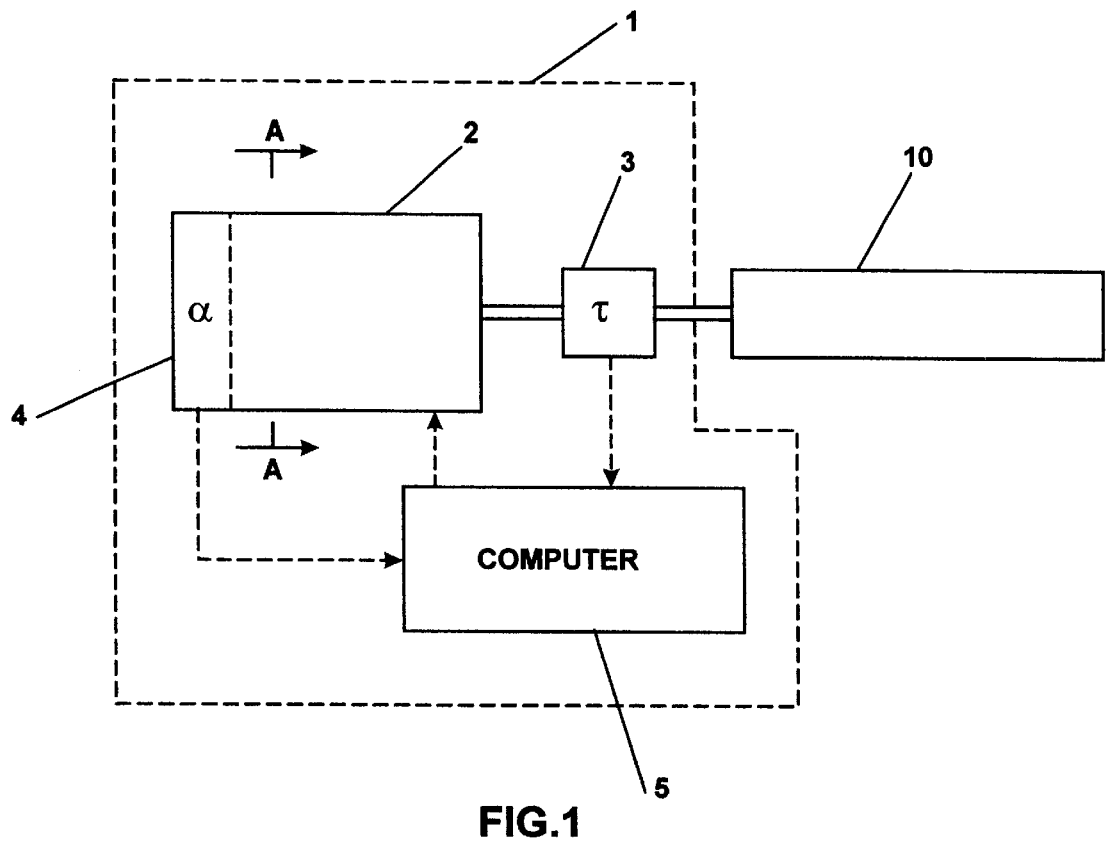
FIG. 1 is a schematic layout diagram illustrating an apparatus according to this invention.

In FIG. 1, the apparatus of the invention is illustrated as everything contained within a broken line 1, namely a variable rate simulated test joint 2 as described in WO98/10260, in conjunction with means 3 for monitoring the pulsed output torque of the impulse tool and/or an angle encoder 4 for monitoring angular movement of the shaft. The simulated test joint 2 is under the control of a computer 5 which takes inputs from the torque monitoring means 3 and the angle monitoring means 4, and in use the apparatus 1 is used in the calibration of a rotary power assembly tool 10. In the following description the assembly tool 10 is an impulse tool.

Figure 2:
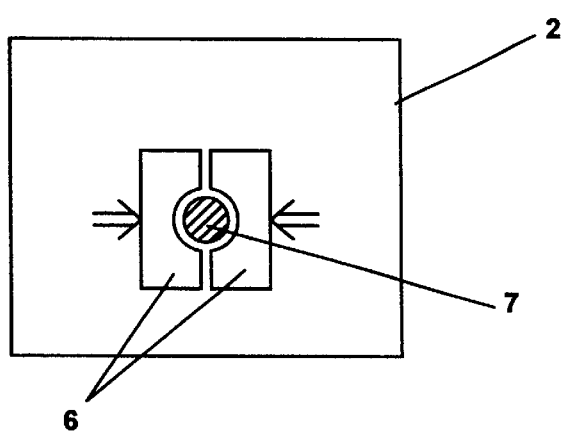
FIG. 2 is a schematic section along the line A—A of the variable rate simulated test joint of FIG. 1.

FIG. 2 illustrates schematically that the simulated test joint 2 comprises a pair of brake shoes which act directly on the outer circumference of a shaft 7 to which the tool 10 is keyed, so that the total inertia of the simulated test joint is maintained at an absolute minimum, comparable to that of the lowest sized joint to be simulated. The inertia can always be increased for the simulation of larger joints by the addition of appropriately sized connection heads between the apparatus 1 and the tool 10, as discussed in WO98/10260.

Figure 3:
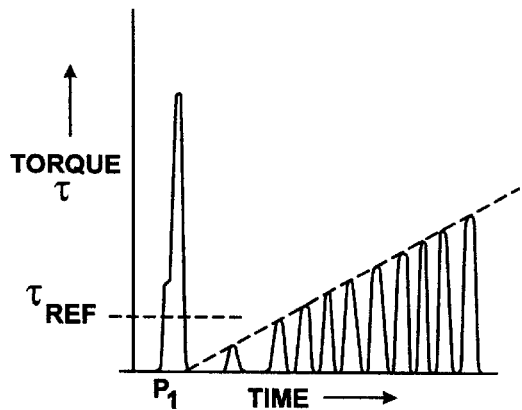
FIGS. 3 and 4 are torque/time graphs illustrating a prior art control of a variable rate simulated test joint.

FIG. 3 illustrates the way in which the transition from Phase 2 to Phase 3 of the test sequence was established according to the prior art. No previous apparatus existed for the calibration of impulse tools other than that of WO98/10260, and references to the prior art therefore refer to that earlier patent application.

FIG. 3 shows Phase 1 and the commencement of Phase 2 of a test sequence according to the prior art. During Phase 1 the tool under test is run without load to reach its maximum free-running speed. Output torque is monitored, and as the power tool is an impulse tool, this is a pulsed output. Pulses are ignored if they are less than a given threshold torque $\tau_{ref}$, which is calculated as the minimum torque needed to create a measurable angular movement of the shaft. As the brake shoes 6 are gradually applied to the shaft 7, the pulse tool 10 typically develops a first output pulse P1 which typically would be well above the threshold torque $\tau_{ref}$. Depending on the impulse tool itself, that first output pulse P1 may be preceded or succeeded by a 'shadow' output pulse which may be greater than or less than the given threshold torque $\tau_{ref}$, but preferably the frequency response of the monitoring means is such that a pair of such pulses is identified and counted as a single pulse Pl. In FIG. 3 the 'shadow' output pulse is postulated as being immediately before the principal first pulse and of a lower torque output, and by virtue of the filtering of the sensed output signal which is a characteristic of the frequency response of the monitoring means, that double pulse is shown in FIG. 3 as a single pulse with an irregularity in its rising edge. Thereafter the braking torque is increased as a linear function of time at a predefined gradient representative of the torque rate of the joint being simulated. It will be seen from FIG. 3 that the first few pulses following P1 are erratic in frequency.

Figure 4:
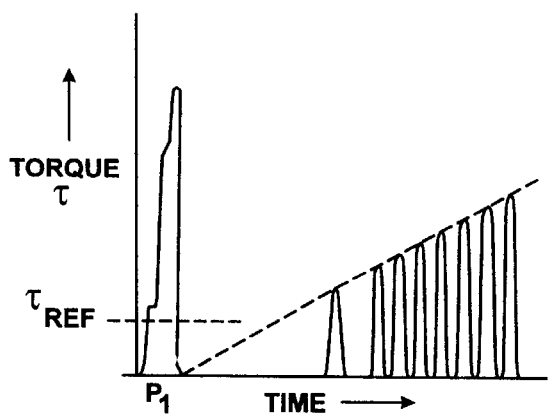

FIG. 4 shows an alternative pulse sequence that could be produced using exactly the same or a different pulse tool. In FIG. 4 the erratic nature of the first few pulses following P1 is different from that of FIG. 3. FIG. 4 shows how the initial pulse P1 might be generated a significant time before the next pulse in the sequence, and well before the tool settles into a regular pulse output. Without limiting this patent application to the accuracy or otherwise of the explanation of this particular pulse pattern, it is postulated that perhaps some side load on the simulated test joint might produce the initial rogue pulse P1. It is quite feasible that two or more such pulses might be generated in this way. When the test routine causes the magnitude of the braking torque to increase as a linear function of time with a predefined gradient, the onset of the ramped increase in braking effort can be equivalent to one or several complete rotations of the shaft before the next pulse is generated by the impulse tool 10. This clearly destroys the relevance of the test procedure if the joint being simulated is one which goes to maximum torque in significantly less than 360° of angular movement, possibly as small as 30° of angular movement.

Figure 5:
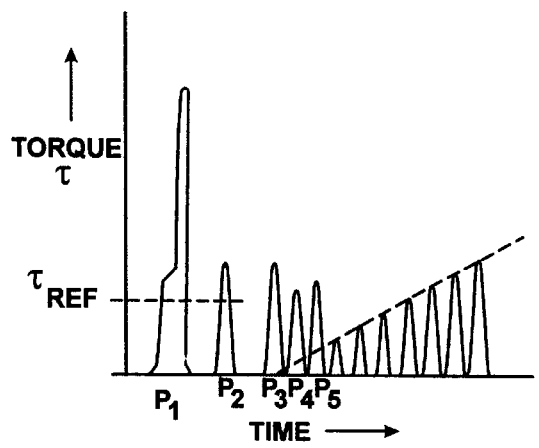
FIGS. 5 and 6 are torque/time graphs corresponding to those of FIGS. 3 and 4 but using the apparatus according to the invention.
Figure 6:
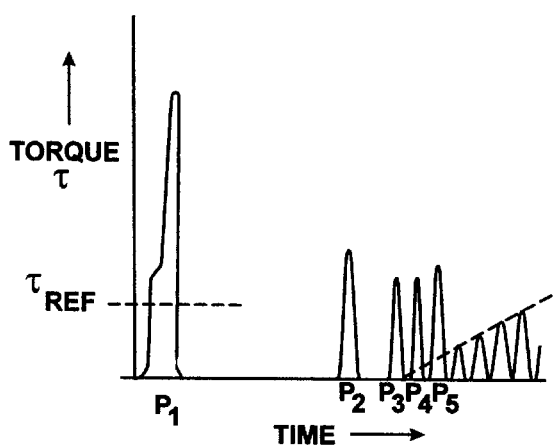

FIGS. 5 and 6 show how the same initial pulse outputs as those illustrated in FIGS. 3 and 4 are treated according to the invention. In FIG. 5, the first five monitored pulses are shown, labelled P1, P2, P3, P4 and P5. P1 and P2 are rogue pulses prior to the pulse tool establishing its constant pulsed output. The monitoring of P3, P4 and P5 establishes that those three pulses are regularly spaced so that the magnitude of the braking torque is then increased as a linear function of time with its predefined gradient, commencing from the first pulse P3 of that identified regular sequence. Exactly the same explanation is applicable to FIG. 6, from which it will immediately be seen that the large spacing between pulses P1 and P2 and the first pulse P3 of the regular sequence does not influence the validity of the test sequence in any way.

Figure 7:
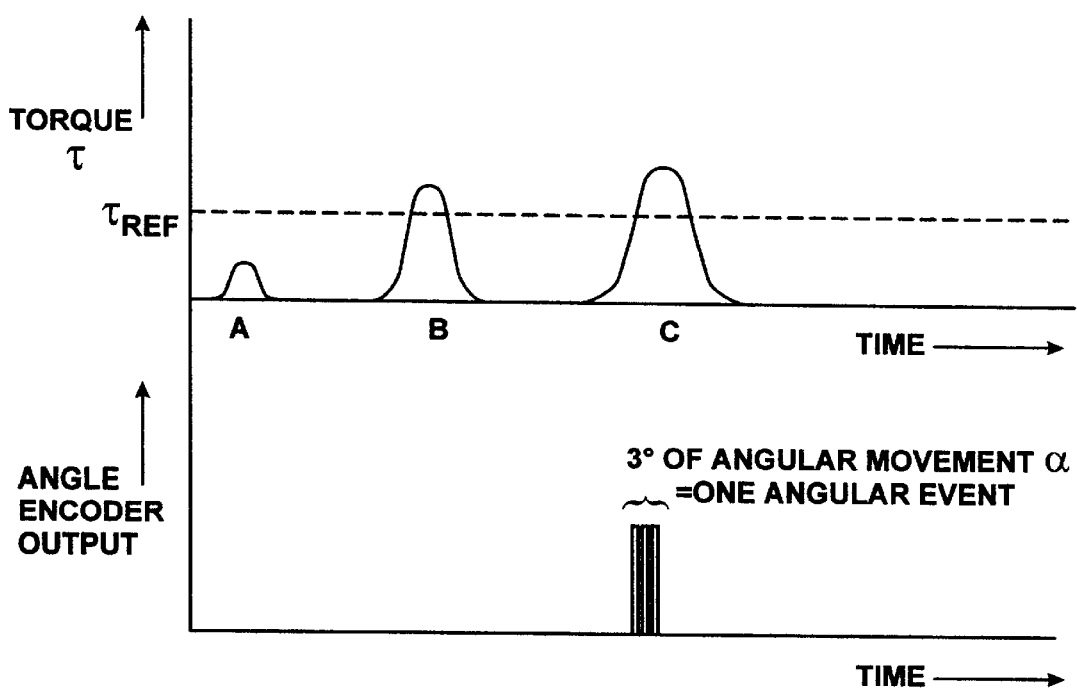
FIG. 7 is a graph with an exaggerted x coordinate illustrating the relationship between a torque pulse output from a strain sensor asociated with the shaft and an angle pulse output from an angle encoder associated with the shaft.

FIG. 7 illustrates a relationship between a pulsed torque output of the tool 10 and angular movement of the shaft 7. A first torque pulse A is less than a given threshold torque $\tau_{ref}$ and produces no angular movement of the shaft. Just to illustrate the erratic nature of the torque/angle relationship in an impulse tool, a second torque pulse B is shown greater than the given threshold torque $\tau_{ref}$ but still producing no angular movement of the shaft. A third torque pulse C is shown greater than the given threshold torque $\tau_{ref}$ and producing an angular movement of the shaft of 3°. That 3° of movement is sensed by the angle encoder 4 as 6 H-to-L or L-to-H transitions in the output of the angle encoder, each transition representing 0.5° of angular movement. The time between individual transitions in the square wave output of the encoder 4 is extremely short as compared with the time between torque pulses, so that each angular movement of the shaft can be easily identified as a single angular event and counted as a single angular pulse. It will of course be appreciated that if the angular rotation of the shaft for a single angular event had been other than a whole number of degrees, then the square wave output of the angle encoder 4 would have shown an odd number of transitions, so that the final transition may have been a L-to-H transition. That does not, however, affect in any way the identification of the angular movement of the shaft as a single angular event.

What is illustrated by FIG. 7 is that the relationship between torque pulse output of a pulse tool and shaft angle movement resuling from that torque pulse output is unreliable and erratic. The inventors have assessed from observations and analysis of experimental results that it is preferred to monitor the angular shaft movement as the monitored pulsed output of the impulse tool, rather than to monitor the torque pulse output, in order to identify reliably from that output the regular stream of output pulses from which to initiate the controlled ramped increase in braking torque applied to the shaft, which forms the basis of the test cycle.

Either of the two rather different analyses of the pulse stream can be used according to the invention to identify Termination of the test sequence, depending on whether the impulse tool is one with automatic shut-off once its rated output torque has been attained, or one which continues to generate its output torque pulses until the operator releases the trigger. The user must set into the apparatus which of those two types of impulse tool is being tested, as the signal processing is different in the two situations.

If the impulse tool has automatic shut-off, then between the commencement of the braking ramp and the automatic shut-off the impulse tool generates a regular series of torque pulses, each of which is responsible for a single angular event of shaft movement, as defined earlier. Either the torque pulses may be monitored, using the means for monitoring the pulsed output of the impulse tool, or individual angular events may be monitored. If the sequence of torque or angle pulses finishes, then the last such monitored pulse indicates Termination of the test sequence.

Identification of Termination is more complex when testing an impulse tool which does not have automatic shut-off. The apparatus of the invention must first be set for use with such a tool. A threshold shaft angle for a single angular event is set into the apparatus. That threshold may be user-selected or may be a standard pre-set fixed or default angle threshold of, for example, 1.5°. As the magnitude of the braking torque applied to the shaft by the brake shoes is increased in Phase 3 as a linear function of time with the predefined gradient, both the torque pulses and the angular movements of the shaft are monitored. The total angular movement associated with a single torque pulse is recognized as a single angular event, the size of which is preferably measured by counting the number of transitions of the shaft angle encoder. As the braking torque on the shaft increases, so the applied torque in the monitored torque pulses increases and the associated angular events decrease. When a torque pulse results in an angular event equal to or less than the threshold shaft angle, then Termination of the test sequence may be established. Alternatively the monitoring may continue, and only when a number of sequential torque pulses, such as two or three, all produce angular events equal to or less than the threshold shaft angle is Termination established. In either case Termination may be regarded as the last pulse to provide an angular event above the threshold shaft angle or the first pulse to provide an angular event equal to or less than the threshold shaft angle.

If the pulse stream stops without there being recorded an angular event less than the threshold shaft angle, then the operator has released the trigger of the tool being tested before the test is complete, and an ABORTED TEST warning should be displayed.

Figure 8:
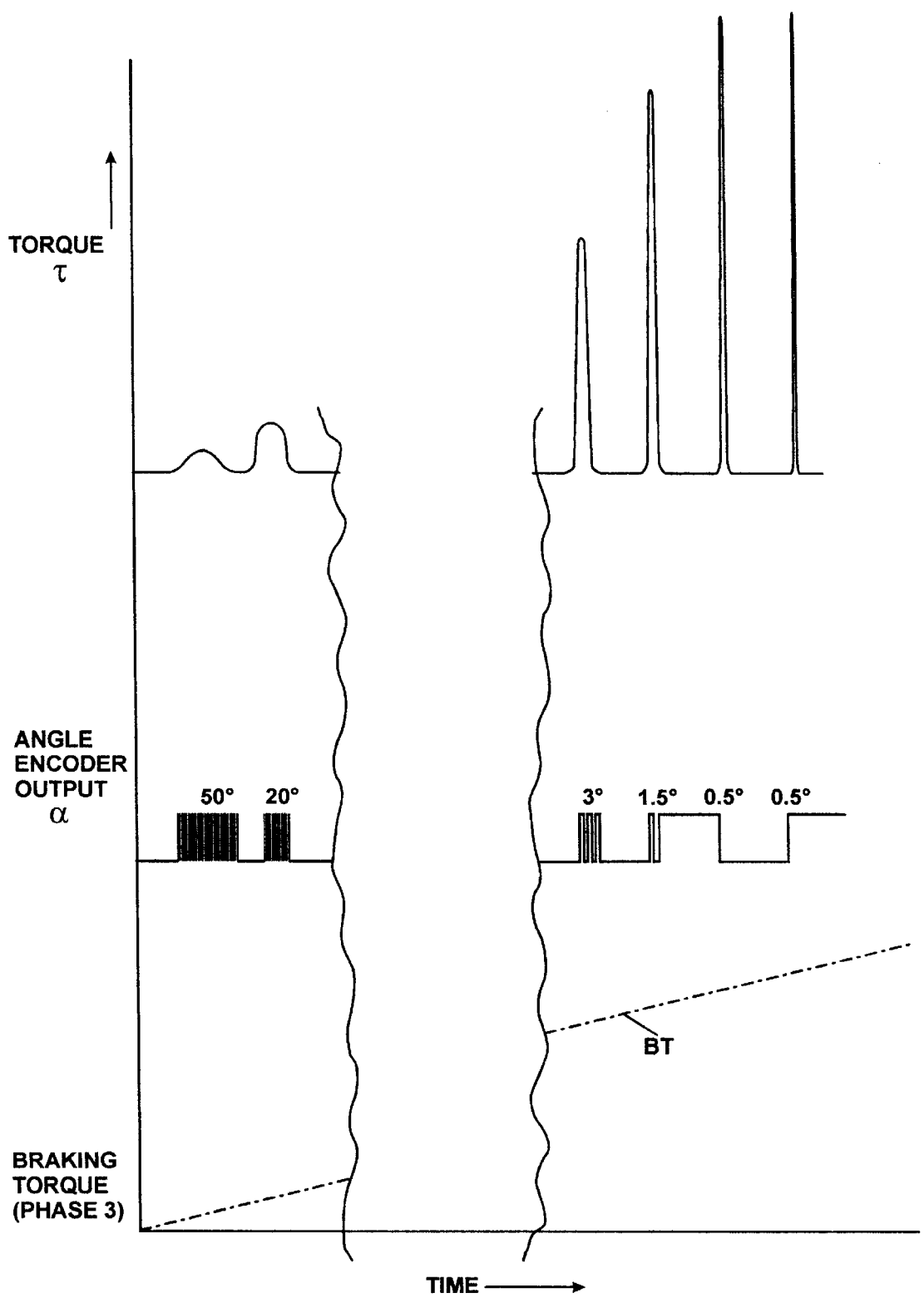
FIG. 8 is an angle/time graph illustrating the identification of termination of the test cycle using an apparatus according to the invention.

Establishment of Termination in the case of testing an impulse tool without automatic cut-off is illustrated in FIG. 8. The graph illustrates a typical progression of torque pulses and associated angular events from the commencement of the regularly increasing braking torque ramp. The braking torque ramp is illustrated by the chain-dotted line BT, and is responsible for a regular series of torque pulses τ and angle pulses α. Each angle pulse α is measured as a count of the H to L or L to H transitions of the output of the shaft angle encoder 4 of FIG. 1, and the total measured angle of each angular event is shown as a number above the encoder output in FIG. 8. The first angular event may be as high as 50° of shaft movement resulting from a relatively low torque pulse from the tool being tested. FIG. 8 then shows an angular event of 20° resulting from a higher torque pulse, and so on with the angular events decreasing in size until a short and large torque pulse produces an increase of shaft angle of 3°. FIG. 8 shows how subsequent very high torque pulses, of extremely short duration, produce angular events of 1.5° and 0.5°. It is important to recognize that these final torque measurements, as the simulated joint approaches the solid locked condition, are unreliable. All torque and angle pulse measurements are recorded in memory, so that the program controlling the apparatus can look back through the previous pulse history after the 1.5° and 0.5° angular events have been measured and recorded. Termination is defined as the torque pulse which resulted in the 3° angular event, as indicated in FIG. 8.

The apparatus of the invention enables rotary power assembly impulse tools to be calibrated reliably and consistently for the first time, without rogue results being obtained through sporadic uncharacteristic outputs of the pulse tool such as can occur in practice.

What is claimed is:

1. Apparatus for calibrating rotary power assembly impulse tools, comprising:
    a variable rate simulated test joint in which a rotary shaft is braked by brake shoes in direct contact with the shaft under the control of a computer;
    means for gradually increasing the braking torque applied to the shaft by the braking shoes while the shaft is driven at free-running speed by the tool being calibrated;
    means for monitoring the pulsed output of the impulse tool;
    means for recognizing from the monitored pulsed output a periodic stream of output pulses from the impulse tool and for identifying the first pulse of that periodic stream; and
    means for increasing the magnitude of the braking torque as a linear function of time with a predefined gradient representative of the torque rate of the joint being simulated, commencing with the identified first pulse.

2. Apparatus according to claim 1, wherein the means for recognizing the periodic stream of output pulses from the impulse tool comprises means for identifying n successive pulses at the same time spacing, within defined limits, where n is an integer greater than 2.

3. Apparatus according to claim 2, wherein n is 3 or 4.

4. Apparatus according to claim 2, wherein the time spacing is approximately that of the natural pulsing frequency of the tool.

5. Apparatus according to claim 1, wherein the means for monitoring the pulsed output of the tool comprises means for monitoring output torque.

6. Apparatus according to claim 5, wherein the monitoring means ignores output torque pulses less than a given threshold.

7. Apparatus according to claim 1 wherein the means for monitoring the pulsed output of the tool comprises means for monitoring angular movement of the rotary shaft.

8. Apparatus according to claim 7, further comprising means for counting the number of angular events of angular shaft movement between commencement of the increase in magnitude of the braking torque as a linear function of time with the predefined gradient, to termination of the test sequence.

9. Apparatus according to claim 8, wherein termination of the test sequence is established by identifying, from the periodic stream of output pulses from the impulse tool, the last pulse of that periodic stream to generate an angular event of angular shaft movement in excess of predetermined threshold value.

10. Apparatus according to claim 9, wherein the predetermined threshold value is user-variable.

11. Apparatus according to claim 9, wherein the predetermined threshold value is preset in the apparatus as a fixed or default value and is approximately 1.5°.

* * * * *

UNITED STATES PATENT AND TRADEMARK OFFICE
CERTIFICATE OF CORRECTION

PATENT NO.    : 6,595,034 B1
DATED         : July 22, 2003
INVENTOR(S)   : David Ogilvie Crane, Peter William Everitt and Mark Simon Sloan It is certified that error appears in the above-identified patent and that said Letters Patent is hereby corrected as shown below:

<u>Title page,</u>
Item [75], Inventors, change "Ogilivie" to -- Ogilvie --

Signed and Sealed this

Fourth Day of November, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,595,034 B1  
DATED : July 22, 2003  
INVENTOR(S) : David Ogilvie Crane, Peter William Everitt and Mark Simon Sloan It is certified that error appears in the above-identified patent and that said Letters Patent is hereby corrected as shown below:

<u>Title page,</u>  
Item [57], ABSTRACT,  
Line 1, change "celibrating" to -- calibrating --.

<u>Column 4,</u>  
Line 8, change "exaggerted" to -- exaggerated --.

Signed and Sealed this

Ninth Day of December, 2003

JAMES E. ROGAN  
*Director of the United States Patent and Trademark Office*